United States Patent [19]

Chujoo et al.

[11] 3,909,179
[45] Sept. 30, 1975

[54] BI-AXIALLY ROTATIONAL SYNTHETIC RESIN MOLDING MACHINE

[75] Inventors: Yasuaki Chujoo, Kodaira; Jisaku Miyaji, Ichikawa, both of Japan

[73] Assignee: Funabashi Kasei Co., Ltd., Tokyo, Japan

[22] Filed: Nov. 13, 1972

[21] Appl. No.: 305,788

[30] Foreign Application Priority Data
May 26, 1972 Japan.................... 47-51695

[52] U.S. Cl.................... 425/429; 264/311
[51] Int. Cl.².................... B29C 5/04
[58] Field of Search.......... 425/429, 430, 435, 425; 264/311, 370

[56] References Cited
UNITED STATES PATENTS

| | | | |
|---|---|---|---|
| 1,875,031 | 8/1932 | Landau | 425/429 X |
| 2,278,858 | 4/1942 | Fields | 425/435 |
| 2,603,836 | 7/1952 | Rempel | 425/430 |
| 2,881,476 | 4/1959 | Page | 425/430 |
| 2,967,329 | 1/1961 | Friedland et al. | 425/430 X |
| 3,072,965 | 1/1963 | Miller | 425/430 X |
| 3,172,160 | 3/1965 | Woodhouse | 425/429 |
| 3,197,827 | 8/1965 | Haughton et al. | 425/435 X |
| 3,214,506 | 10/1965 | Corbin, Jr. | 425/429 X |
| 3,337,662 | 8/1967 | Spencer | 425/429 X |
| 3,457,986 | 7/1969 | Andrews | 425/435 UX |
| 3,676,037 | 7/1972 | Pivar | 425/182 X |
| 3,744,951 | 7/1973 | Szatkowski | 425/150 X |

*Primary Examiner*—Robert L. Spicer, Jr.
*Attorney, Agent, or Firm*—Lane, Aitken, Dunner & Ziems

[57] ABSTRACT

An inclined, bi-axially rotational molding machine for use in producing a synthetic resin container is disclosed, which comprises a cylindrical metal mold adapted to rotate about its own axis parallel to a base or platform and mounted thereon; said base or platform being adapted to rotate about another axis perpendicular to said former axis, in a plane inclined with respect to the horizontal plane.

10 Claims, 6 Drawing Figures

(A)

(B)

(C)

BI-AXIALLY ROTATIONAL SYNTHETIC RESIN MOLDING MACHINE

BACKGROUND OF THE INVENTION

1. Field of the Invention

This invention relates to a synthetic resin rotational molding machine and more particularly to an inclined, bi-axially rotational molding machine, well suited for the production of a bulky plastic container of a cylindrical shape.

2. Description of the Prior Art

The demand arising from the modern development of the chemical industry for bulky plastic containers has created a novel approach to simple, trouble free and efficient bi-axially rotational molding technique for molding plastics.

Of this type of techniques, there are two fundamental type of molding machines; i.e., 1. a combination of a cylindrical metal mold rotatable about its own axis which is maintained vertical and the frame or base mounting said mold thereon and adapted to rotate about another axis which is maintained horizontal; and
2. a combination of a cylindrical metal mold rotatable about its own axis which is maintained horizontal and the frame or base mounting said mold thereon and adapted to rotate about another axis which is maintained vertical.

Incidentally, the thickness of the layer of plastics to be sintered against the inner wall of a cylindrical metal mold is governed by the following factors:

i. temperature of the inner wall of the mold being heated;
ii. time duration of the plastics powder being in contact with said inner wall of the rotating mold; and
iii. pressure of the plastics powder against the inner wall of the rotating mold.

Reverting to the aforesaid two combinations of bi-axial rotational molding machines with particular attention to the movement of the rotating metal mold itself, there are inherent drawbacks in each case;

Firstly, in the case of the cylindrical metal mold rotating about the vertical line as referred to in the above paragraph (1), the pressure of the plastics powder against the bottom or top surface of the cylindrical mold is apparently greater than that against the side or inner peripheral wall of said cylindrical mold. This apparently results in greater wall thickness of the bottom or of the top portion of the container produced.

Secondly, in the case of the cylindrical metal mold rotating about the horizontal line as referred to in the above paragraph (2), the pressure of the plastics powder against the bottom or top surface of the cylindrical mold is less than that against the side or inner peripheral wall of the mold, and in the worst case, there results no adhesion of plastics on the central portion of the bottom or top side of the mold, because the amount of the plastics powder is usually insufficient to give rise to a heap of sufficient height.

To compensate for the above two drawbacks, aside from the temperature and time duration factors as referred to in the paragraphs (i) and (ii), there has arisen an idea of providing a rotational mold which has a longitudinal axis inclined with respect to the horizontal, thus facilitating the pressure application of the plastics powder against both the bottom or top surface and the inner peripheral wall of the cylindrical metal mold at the same time. In this sense, this type of arrangement can be said to be an improvement over such primitive steps of the rotational molding machine.

As a conventional but initial approach to this type of machine, there is a known so-called rocking type molding machine. This rocking type molding machine has a cylindrical rotational metal mold which, like a seasaw, is mounted on a base or platform supported at its midway on a suitable fulcrum, with said base secured through a mechanical link or a hydraulic cylinder to an oscillation source. With the production of bulky or massive plastic containers, such machines require costly, complicated construction which in turn leads to undesirable mechanical troubles during its long and repeated service cycles due to the impact of the stress, and thermal influence such as, for instance, the loosening of the mechanical connection of the links. This further causes an unsmooth rocking movement of the machine and there results the formation of a plastic container of non-uniform wall thickness, and the interruption of the molding operation, thus resulting in excessive manpower.

To go further in to detail in to the aspect of the flow status of the plastics powder and the melting thereof, although this aspect is even more important than the mechanical shortcomings, the heap of powder will move from the raised end of the mold down to the lowered end thereof during the rocking motion while, during its travel, the heap of powder is spread circumferentially due to the rotation of the mold about its axis, i.e., due to the friction between the powder and the inner wall of the rotating mold. In this sense, therefore, it can be said that the rotation of the mold about its axis serves to spread the powder circumferentially and thus presents a uniform layer of the powder. This action apparently assists in the formation of the uniform wall thickness of the plastic container. However, such powder spreading action is not so simple, but involves resonance problems due to the factors such as R.P.M. of the mold about its two axis and the length of the cylindrical mold and the rocking frequency, etc. Accordingly, it is preferable that an additional spreading force be applied to the plastics, whether in powder state or in melted state, to enhance the powder spreading action.

It is accordingly an object of the present invention to provide a bi-axially rotational molding machine for use in producing cylindrical plastic containers which machine presents a cylindrical metal mold adapted to rotate about its own axis parallel to a plane which is inclined with respect to the horizontal.

It is another object of the invention to provide such a bi-axially rotational molding machine which gives additional spreading force to the plastics powder or melt to thereby provide more uniform spreading of the plastics powder and hence a uniform wall thickness of a product of a cylindrical shape.

SUMMARY OF THE INVENTION

According to the present invention, there is provided a bi-axially rotational molding machine, which consists of a cylindrical metal mold supported on bed rolls in such a manner that said mold can rotate about its axis parallel to a base or platform which is adapted to rotate about another axis perpendicular to said former axis, in a plane inclined with respect to the horizontal plane.

With this arrangement, unlike the rocking type bi-axially rotational molding machine, there is no need to provide complicated mechanism such as cams and linkages or hydraulic pistons or cylinders and valves with accompanied timing control means. Furthermore, the powder or melt of the plastics is subjected to the spreading force due to the inertia force acting thereon in the negative or positive direction depending on whether the powder dwells on either side of the mold with respect to the rotational center in the inclined plane. This adds to the spreading force experienced in the case of a rocking type molding machine wherein mere rotation of the mold about its own axis is effected, i.e., the mere spreading action due to the friction between the powder and the inner peripheral wall of the rotating mold. (The molding process according to the present invention is referred to as 'Planetary Molding Process' in Japan).

The base or platform according to the present invention is simply journaled in bearings housed in a cylinder which is inclined with respect to the vertical. Thus, such an arrangement is free from troubles such as were referred to earlier, as well as from the excessive manpower as required in use of the conventional rocking type molding machine. Furthermore, such an arrangement is best suited for the molding of a bulky, cylindrical container such as, for instance, over 2 m in diameter and over 4 meters in length yet with a simple construction. For molding of such a bulky, cylindrical container, there would be required considerably large cams and long armed links coupled to the platform, or costly hydraulic means on a large scale which, nevertheless, is bound to lead to some mechanical troubles.

DESCRIPTION OF THE PREFERRED EMBODIMENTS

Figure 1:
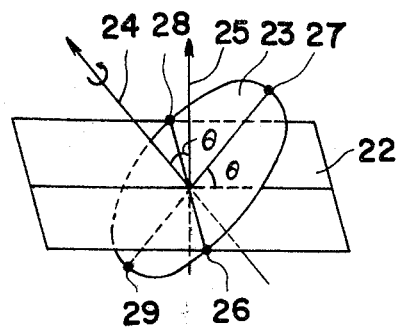
FIG. 1 is a graph showing, the revolution plane and axis inclined to the vertical and the mold, which is not shown, is set on the revolution plane so as to rotate around its own axis parallel to the revolution plane.

As shown in FIG. 1, a metal mold (not shown) rotates about its own axis parallel to a plane 23 inclined to the horizontal plane 22, while the platform (not shown) revolves in plane 23 by rotating around the axis 24 (which hereinafter will be referred to as a revolution axis) which is perpendicular to the plane 23 and rotating axis of the metal mold and inclined at a given angle $\theta$ to the vertical direction 25.

There are provided a pair of bed rolls mounted on and parallel with the surface of the platform, said rolls being adapted to mount thereon a metal mold adapted to rotate about its own axis, while the platform is adapted to rotate about the revolution axis in the plane inclined to the vertical, and thus the metal mold will rotate in the plane inclined to the vertical with the rotational axis being parallel to that of the rotating platform. At this time, the angle of the rotational axis of the metal mold to the horizontal plane will vary in turn from $0, +\theta, 0$ and $-\theta$, during one cycle of the revolution, that is to say, in FIG. 1 from a vernal equinox point 26, northern revolution point 27, autumnal equinox point and southern revolution point, thus rocking in the vertical plane. Assuming the length of metal mold along the rotational axis being $L$, then the amplitude of the rocking motion $\Phi = L/2$ sine $\theta$. Thus, the rotational movement at a constant speed can be converted into a sine curve, thereby effecting the rocking movement of the angle $\theta$ in the vertical plane including the rotational axis of the metal mold.

On the other hand, the inclined angle $\theta$ of the revolution axis can vary from 0° to 90°, and thus in the case of $\theta = 0$, the platform will rotate in the horizontal plane. This corresponds to the case of the metal mold having a horizontal rotational axis which fails to satisfy the effect of bi-axially rotational molding process. In the case of $\theta = 90°$, the platform will rotate in the vertical plane and thus this case corresponds to the case of the metal mold having a vertical rotational axis, as has been described as an ideal case of bi-axially rotational molding process. Accordingly, the angle $\theta$ of the revolution axis to the vertical should preferably be in the range from 45° to 60°. In case the metal mold is considerable length, as shown in FIG. 2(A), the angle $\theta$ may be set to a smaller angle relative to the case where the cross-sectional shape of the metal mold is shaped more closely like a cube or sphere, as shown in FIG. 2(C).

Figure 2:
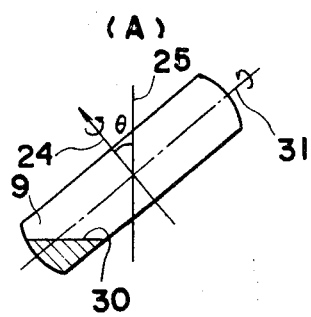
FIG. 2 (A), (B) and (C) are diagrammatical views showing in cross section the status of the plastics powder inside the rotating mold.
Figure 2:
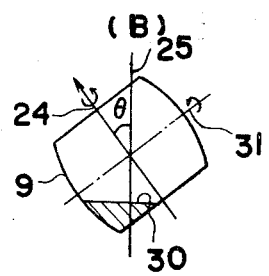
Figure 2:
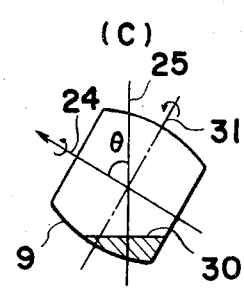

In operation, when the resin powder 30 supplied in the metal mold takes the position by means of gravity as shown in FIG. 2(A), then the top surface of the resin powder will be positioned above the rotational axis 31 of the metal mold. The cases as shown in FIG. 2 (A) and (C) are acceptable, while the case as shown in FIG. 2 (B) is not acceptable, wherein the top surface of the resin powder is below the axis 31. Thus, as shown in FIGS. 2(A) and (C) the angle $\theta$ should be such that the rotational axis 31 of the mold intersects the free surface of the resin powder 30 within the mold. This insures that the entire inner surface of the mold 9 will be coated with the resin when the mold is rotated about the two axes as described above.

Figure 3:
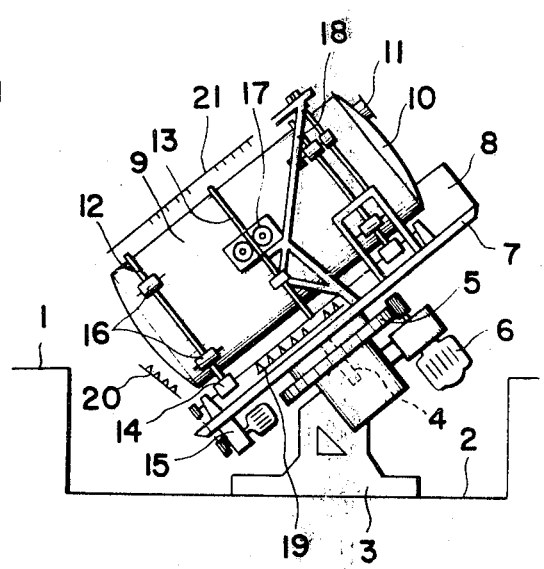
FIG. 3 is a side elevation of the molding machine as viewed in a direction of the line 26 – 28 in FIG. 1 according to the present invention.
Figure 4:
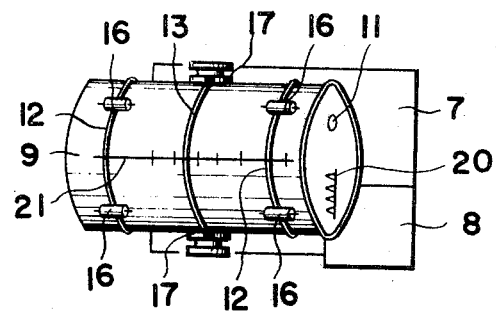
FIG. 4 is a plan view of the molding machine of FIG. 3.
Figure 5:
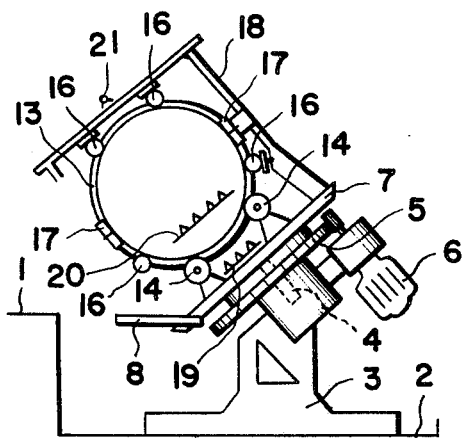
FIG. 5 is a side elevation of the molding machine of the present invention, as viewed in a direction of line 227 – 29 of FIG. 1.
Figure 6:
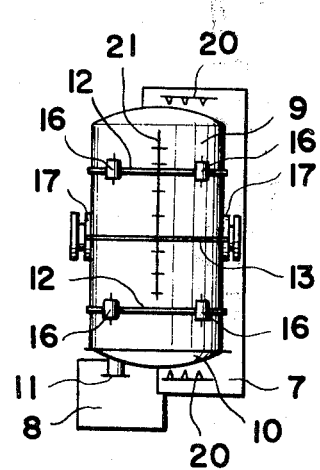
FIG. 6 is a plan view of the machine of FIG. 5.

Turning now to FIG. 3, shown at 1 is an operational base and shown at 2 is a pit of a cylindrical or cubic shape. A supporting shaft 4 mounting an inclined platform thereon is rotatingly journaled in the inclined portion of a base 3 of the machine. Running through the central portion of the supporting shaft 4 are pipes used for passing cooling water and fuel gas, while a revolution gear 5 and a motor 6 for use therewith are mounted on said supporting shaft 4. An inclined platform 7 is set at right angles to the revolution axis 4, while an operational platform 8 is secured as shown in FIG. 5 to one end of said inclined platform 7. The operational platform 8 is provided for the convenience of the operator, being maintained in a horizontal direction so as to facilitate charging of the material and discharging of the molded product. Shown at 9 is a cylindrical metal mold with the removable ceiling closure 10 having a flange and a man hole 11. Designated at 12 is a tire extending around the outer peripheral of the metal mold, said tire being adapted to rest on the bed rolls, and at 13 a flange serving to protect the lateral sliding of the mold. Shown at 14 is a bed roll mounting the rotating metal mold thereon, at 15 a motor for rotating the mold, at 16 auxiliary supporting rolls, at 18 a frame mounting supporting rolls 16 and 17 heating burners 19 and 20 and the metal mold on its bottom, and at 21 a pipe for use as a water spray for cooling.

The metal mold as shown is of a volume of 30 m², with the flat bottom and convexed ceiling closure, while the ceiling closure is secured by means of a flange having bolts to the body of the mold to provide an air tight closure. When the product is taken out from mold, the ceiling closure is opened. The ceiling closure has a hatch type man hole, being provided with a pressure equalizing pipe, and the man hole is used for charging the mold with starting material of resin powder (polyethylene powder). The metal mold is set to position beforehand by means of bed rolls and supporting rolls. When the inclined platform 7 rotates to a position where the metal mold is positioned at the vernal equinox and autumnal equinox points 26 and 28, respectively, then the metal mold 9 will take position parallel to the floor, thus providing an operational platform 8 whose position is convenient for an operator charging the resin powder in the mold.

With the operational platform maintained in such a position, the operator opens the hatch of the man hole 11 to charge the starting material of polyethylene powder (melting point of 240° to 250°C) and then closes the hatch. Then, the rotation of the metal mold 9 is initiated and the burners 19 and 20 are lit to provide heat to the metal mold so as to melt the resin within the mold, while the revolution of the platform is commenced therewith. After the heating for a given time period, the resin powder inside the metal mold will be sintered or melted over the inner peripheral wall of the metal mold.

Upon completion of heating, the platform 7 is stopped at the vernal equinox and autumnal equinox points, while allowing the rotation of the metal mold about its own axis for air cooling, followed by cooling with water spray supplied from the pipe 21. When the temperature at the outer periphery of the metal mold falls as much lower as room temperature, then the water cooling and the rotation of the mold about its axis are stopped and then the molded product is removed by opening the ceiling closure, thus completing one cycle of the molding operation.

As is apparent from the foregoing description, the resin powder in the metal mold is subjected to the spreading forces due to the revolution of the platform 7 in addition to that due to the friction between the resin powder and the heated inner peripheral wall of the mold, while avoiding the aforementioned shortcomings of the fundamental bi-axial rotational molding machines. It should be particularly recognized that, due to the simple construction, the machine of the present invention particularly permits smooth rotation and is best suited for the molding of bulky cylindrical containers.

What is claimed is:

1. A bi-axially rotatable molding machine, comprising a rotary platform mounted for rotation about a first axis disposed at a predetermined angle with respect to the vertical, the platform including a mold supporting surface thereon adapted to revolve in a plane inclined with respect to the horizontal at an angle less than 90°, means for revolving said rotary platform about said first axis, a hollow mold rotatably mounted on said mold supporting surface for rotation about a second axis disposed perpendicular relative to said first axis, said hollow mold capable of being charged with a material to be molded and having a final product withdrawn therefrom, a plurality of supporting rollers mounted on said rotary platform for supportingly engaging the circumference of said hollow mold, means for rotating said hollow mold about said second axis.

2. A bi-axially rotatable molding machine as set forth in claim 1, wherein said means for rotating said platform includes a center shaft connected thereto.

3. A bi-axially rotatable molding machine as set forth in claim 1, wherein said mold is generally cylindrical in shape.

4. A bi-axially rotatable molding machine as set forth in claim 1, and further including heating means mounted on said frame.

5. A bi-axially rotatable molding machine as set forth in claim 1, wherein said machine includes cooling means for cooling material molded therein.

6. A bi-axially rotatable molding machine as set forth in claim 1, wherein said mold includes a removable closure member at one end thereof, said closure member including means through which molding material can be introduced into said mold.

7. A bi-axially rotatable molding machine as set forth in claim 3, wherein said mold includes annular flange means circumferentially mounted thereon for preventing lateral sliding movement of said mold.

8. A bi-axially rotatable molding machine as set forth in claim 1, further comprising an operational platform on said rotary platform in a position below one end of said mold.

9. A bi-axially rotatable molding machine as set forth in claim 4, wherein said heating means includes a gas burner fixedly mounted on said rotary platform.

10. A bi-axially rotatable molding machine as set forth in claim 5, wherein said cooling means includes a water pipe fixedly mounted on said rotary platform for spraying cooling water over the exterior of said mold.

* * * * *